United States Patent [19]

Haneda et al.

[11] Patent Number: 5,025,272
[45] Date of Patent: Jun. 18, 1991

[54] DOT EXPOSURE TYPE IMAGE FORMING APPARATUS

[75] Inventors: Satoshi Haneda; Hiroyuki Nomori, both of Hachioji, Japan

[73] Assignee: Konica Corporation, Tokyo, Japan

[21] Appl. No.: 456,364

[22] Filed: Dec. 26, 1989

[30] Foreign Application Priority Data

Dec. 28, 1988 [JP] Japan .................. 63-330865

[51] Int. Cl.$^5$ .......................................... G01D 15/06
[52] U.S. Cl. ................................................ 346/153.1
[58] Field of Search ............................. 346/153.1, 157

[56] References Cited

U.S. PATENT DOCUMENTS

| 3,942,980 | 3/1976 | Hou | 346/159 X |
| 4,851,926 | 7/1989 | Ishikawa | 346/154 X |
| 4,931,876 | 6/1990 | Hashizume | 346/154 X |
| 4,935,756 | 6/1990 | Hotomi et al. | 346/153.1 X |

Primary Examiner—George H. Miller, Jr.
Attorney, Agent, or Firm—Jordan B. Bierman

[57] ABSTRACT

The invention provides an apparatus for forming a toner image by reversal development. In the apparatus, there are provided an electric charger for uniformly charging a photoreceptor to a given electrostatic potential; the photoreceptor discharging in response to an exposure light to form an electrostatic latent image, the photoreceptor having a predetermined light decay curve indicating a relation between an amount of the exposure light and a discharged potential on the exposed portion wherein an absolute value of the differential coefficient of the light decay curve is small when the amount of the exposure light is small and the value sharply becomes large when the amount of the exposure light increases; a laser beam exposure device for exposing the photoreceptor with a dot-shaped light beam; and a developing device for providing toner onto the exposed portion of the latent image, thereby forming a toner image.

20 Claims, 6 Drawing Sheets

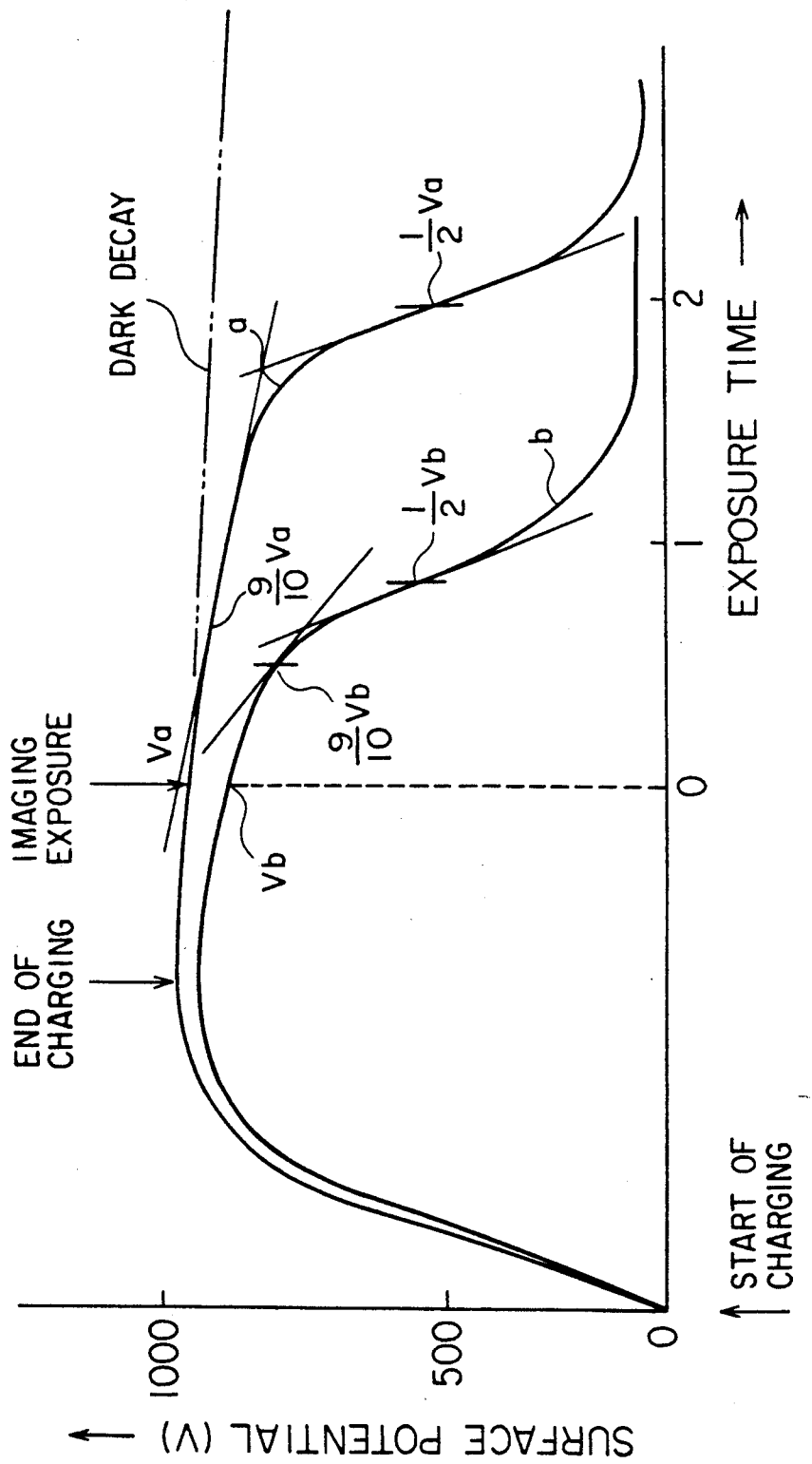

DOT EXPOSURE TYPE IMAGE FORMING APPARATUS

BACKGROUND OF THE INVENTION

This invention relates to an image forming apparatus in which an electrostatic latent image is formed on a photoreceptor by dot exposure wherein the photoreceptor is exposed with a dot-shaped scanning exposure light beam, and more particularly, to an image forming apparatus in which reversal development is conducted to the electrostatic latent image.

In conventional electrophotography, first of all a photoreceptor is charged, by an ordinary method, in order to give photosensitivity to the photoreceptor. Then, the photoreceptor is exposed in order to form a static electric latent image on its surface. Hereinafter, a static electric latent image is called 'a latent image'. The latent image is developed by a dry or a wet developer and then transferred to a transfer paper by the action of static electricity or through an intermediary body, and then fixed to form a visible fixed image.

In order to form a visible image by electrophotography, it is necessary to form a latent image on the surface of a photoreceptor which has an excellent electrostatic charging property, dark decay characteristics, light decay characteristics, and gradation property.

A photoreceptor used in a transfer type copier is required to have durability such that gradation and quality of images are not deteriorated because of fatigue even when the photoreceptor is repeatedly used to obtain many copies.

Photoconductive semiconductors used in conventional electrophotography are inorganic photoconductive materials such as selenium, zinc oxide, cadmium sulfide, and cadmium selenide, photoconductive pigments such as phthalocyanine, copper phthalocyanine, cobalt phthalocyanine, and nickel phthalocyanine, and organic photoconductive materials such as poly-N-vinyl carbazole, anthracene, and triallyl amine derivatives. These chemical compounds can be dispersed in the binder resin and/or can form a photoreceptor composed of two layers such as a charge generation layer and a charge transport layer.

Recently, transfer type copiers, especially high speed copiers which can make many copies in a short time, are required in the market. For that reason, a photoreceptor whose light decay is fast, is needed. However, the reciprocity effect appears between the optical attenuation speed of the photoreceptor and the characteristics of charging, dark decay, gradation, image quality, and fatigue and deterioration. As a result, a practically desirable photoreceptor has not been obtained yet.

On the other hand, in response to the requirements of expressing better gradation, especially half tone gradation, a beautiful color image, and excellent image quality, the digital image forming method has come to the fore instead of the conventional analog image method. In the digital image forming method in which dot exposure is conducted by a laser beam, conversion and adjustment of an image can be freely carried out and the image position is accurately aligned, furthermore image data can be transmitted and received. The image quality has been improved to a level equal to that of printed matter.

The LED array method, the EL array method, and the liquid crystal array method can be used to conduct dot exposure. The laser beam method is mainly used at the present time because high speed and high density recording is possible by the laser beam method.

In the case of dot exposure, as well as analog exposure, either the positive exposure system, in which non-image portions are exposed to erase the electric charge on the surface of a photoreceptor in order to form a latent image, or the negative exposure system in which image portions are exposed to erase the electric charge, can be used. However, the negative exposure system is used almost exclusively because of its stability of scanning for writing, excellent reproducibility of dots, and shortened exposure time.

In the case of the negative exposure system, the distribution of light intensity used for each dot exposure is approximate to the normal distribution curve, the peak of which is the center of the dot, and the curve has a long gentle slope with wave patterns according to the intensity of light caused by diffraction. This problem becomes important in the case of a laser beam when the light converges to a diameter of not more than 100 $\mu$m, furthermore not more than 50 $\mu$m, by the optical lens system. Furthermore, when pulse-duration modulation is used, this problem becomes more serious since the dot diameter substantially becomes smaller. In this case, the exposure distribution of a dot is approximated to Gaussian distribution and the dot diameter indicates the width at which the peak of exposure is 1/e. The diameter of 100 $\mu$m corresponds to 16 dot/mm of writing density and the diameter of 50 $\mu$m corresponds to 32 dot/mm of writing density.

In the case of the negative exposure system, this wave pattern is remarkable and can be the cause of fog as it acts as a noise. The negative exposure system needs to be combined with reversal development and toner with the same polarity as the electrostatic charge polarity of a photoreceptor must be prepared.

Furthermore, the most appropriate photoconductive semiconductor needs to be selected regarding the light decay curve. Generally speaking, the differential coefficient (the absolute value) of a light decay curve of a photoconductive semiconductor is large in the region of small amounts of light and the electrostatic charge decays sharply. The differential coefficient suddenly becomes small in the region in which the quantity of light is more than a certain amount. As a result, the curve has a gentle slope in this region.

Accordingly, when weak light at the gentle slope portion of the light intensity distribution curve of the above-described spot light, is caught by the electrostatic charge erasing action of the photoreceptor in the region of the small amount of light, the electric potential distribution curve of the formed latent image of a dot becomes funnel-shaped, with a broadly extended edge. Therefore, the peripheral portion of the image developed by toner becomes blurred and fog may also occur.

Those are the reasons why a photoreceptor must be designed to meet the requirements of dot exposure.

Since the dot exposure system has many advantages as described above, it is well-suited to color image forming. charging, image exposure, and developing are repeated many times to superimpose many color toner images on a photoreceptor. The dot exposure system can be applied to this color image forming system. In this color image forming system, when a formed latent image is developed by the contact developing method, the previously formed toner images are damaged. Therefore, there is no alternative but to adopt the noncontact developing method in which a one component or two component developer is used.

In the contact developing method, since the developer comes into contact with the photoreceptor, the toner is attracted to the peripheral portion of the image with the help of the edge effect of the electric field at a latent image on the photoreceptor surface and the density is increased. As a result, sharpness of the image is improved. In the case of non-contact developing, the developer is apart from the photoreceptor. Accordingly, the electric field has a tendency to influence the toner to be drawn to the center of the dot rather than to the peripheral portion of the dot. For that reason, it can not be expected to make the peripheral portion sharp. In order to sharpen the peripheral portion of the dot, it is important that the dot exposure and the optical decay curve have a proper relation.

As described above, a multicolor image can be obtained by repeating exposure, development, and other processes. Accordingly, compared with obtaining a monochrome image, it takes a long time to get a multicolor image and fatigue is increased in the photoreceptor. In order to cope with the situation, it is necessary to reduce the image forming time and to reduce fatigue of the photoreceptor. Conventional technology lacks countermeasures against these points.

In multicolor development, electric potential of the photoreceptor surface is not decreased to the developing level in some cases because of light absorption by the previously adhered toner. This can be the cause of color contamination and deterioration of sharpness. The above-described fact presents a problem of image exposure by visible light.

In the present technical field with regard to toner, the following are important: fluidity of toner to increase static charge property, regularity of toner consumption to eliminate irregular toner consumption in which larger toner particles are consumed first of all and then smaller toner particles are successively consumed, excellent transfer ratio to obtain a high density image, and cleaning property of toner to guarantee repeated copying with excellent reproducibility.

Toner particles are made spherical in order to increase the fluidity of toner, to enhance triboelectric efficiency, and to unify and stabilize static charge property.

However, spherical toner is not always advantageous. Adhesion of toner to the photoreceptor or the developing sleeve is increased by spherical toner particles, and it causes a decrease of the transfer ratio and inferior cleaning of the photoreceptor and the developing sleeve. According to the investigation of the inventors, the more toner particles are spherical, the more toner particles adhere to the above described parts.

The adhesion is caused by physical and electric forces as well as the hardness and evenness of the photoreceptor and the developing sleeve. As far as the photoreceptor is concerned, a part of the reason to cause toner adhesion is the denaturing and softening of the photoreceptor surface caused by corona discharge and oxidation. When contact developing is conducted, the reasons to cause toner adhesion are the toner filming caused by rubbing and Coulomb force acted between the electrostatic charge polarity of the photoreceptor and that of the toner.

The amount of toner which adheres to the photoreceptor and the developing sleeve becomes large, and the toner particles on the photoreceptor and the developing sleeve increase its adhesion, when a period of time between the start and the last operation to clean the photoreceptor and the developing sleeve is long, and the toner adhesion is more repeated.

When the amount of adhesion and the adhesion strength are increased, the transfer ratio decreases, and it can be the cause of inferior cleaning.

SUMMARY OF THE INVENTION

It is the first object of the present invention to provide an improved multicolor image forming apparatus, the characteristics of which will be described as follows.

(a) A digital image forming apparatus which can form a high density dot image with high quality by dot exposure and reversal development.

(b) A digital image forming apparatus which can conduct non-contact reversal development.

(c) A multicolor image forming apparatus which can superimpose color toner images on a photoreceptor, wherein the apparatus is the conventional high speed multicolor image forming apparatus in which a transfer body is used and the photoreceptor is durable with less fatigue property.

In order to attain the first object of the present invention, the inventors took notice of the curve of surface potential decay caused by exposing a photoreceptor which is used in reversal development. The electrostatic potential of the photoreceptor is decayed according to the amount of exposure. The above-described curve shows the relation between the electrostatic potential of the photoreceptor and the amount of exposure. This curve is called the light decay curve in this specification hereinafter. In the case of dot exposure, image forming on the photoreceptor is affected by the gentle slope portions of the light intensity distribution curve of pulse modulated dot-shaped light. In order to eliminate the bad influence of the gentle slope portions of the light intensity curve, a photoreceptor made from a photoconductive semiconductor having the characteristics of which will be explained below, was adopted. The decay of electrostatic potential of the photoconductive semiconductor hardly occurs when the amount of exposed light is small and it occurs sharply when the amount of exposed light exceeds a certain limit. In this way, the peripheral potential of the latent image of a dot drops sharply. As a result, a clear dot image can be obtained.

According to the present invention, the image forming apparatus is composed of a photoreceptor characterized in that the absolute value of the differential coefficient of the light decay curve of the photoreceptor is small when the amount of exposed light is small and the value sharply becomes large when the amount of light increases. Furthermore, the image forming apparatus comprises a process for uniformly charging the photoreceptor, a latent image forming process by dot exposure, and a reversal developing process.

In the light decay curve of the above-described photoconductive semiconductor, assuming that a light sensitivity is represented by $E\frac{1}{2}$ when the electrostatic potential is decayed to $\frac{1}{2}$ and a light sensitivity is represented by $E9/10$ when the electrostatic potential is decayed to $9/10$ at the initial stage of exposure, a photoconductive semiconductor which satisfies the following relation is preferable.

$$1 < (E\tfrac{1}{2})/(E\,9/10)$$

It is more preferable that the photoconductive semiconductor satisfies the following relation.

$$2 < (E\,\tfrac{1}{2})/(E\,9/10)$$

The single layer type semiconductor, such as Se, CdS and the like, and the two layer type semiconductor consisting of a charge generation layer and a charge transport layer are generally known. Many of the photosensitive semiconductors which show the above-described characteristics generally have low sensitivity in the low electric field rather than in the high electric field and the sensitivity decreases as the amount of light increases.

In the conventional copier in which normal development is conducted, it is desirable that the sensitivity is low in the low electric field in order to reproduce letters and the highlight portion of the half tone. For that reason, the photosensitive semiconductor which has the preferable characteristics for the present invention, has not been used.

In this specification, the sensitivity is defined as the decrease amount of potential, which is the absolute value of the differential coefficient, per small amount of light when the photoreceptor has the prescribed potential.

Furthermore, it is the second object of the present invention to provide an improved multicolor image forming apparatus in which spherical toner is used, wherein the multicolor image forming apparatus has a high transfer ratio and high cleaning efficiency.

The above-described second object of the present invention can be attained by an image forming apparatus the details of which will be described below. The image forming apparatus is equipped with a photoreceptor which has a photosensitive layer containing a thermosetting resin in which photoconductive semiconductor powder is dispersed. The image forming apparatus has the processes such as an electrostatic charging process for the photoreceptor, an electrostatic latent image forming process by image exposure, and a non-contact developing process of latent images with spherical toner.

BRIEF DESCRIPTION OF THE DRAWINGS

FIG. 1 is a graph which shows the electrostatic characteristics of a charged photoreceptor of the invention before and after the photoreceptor is exposed.

FIGS. 10-1, 10-2 and 10-3 are explanatory drawings indicating a relation between modulated pulses and patterns.

DETAILED DESCRIPTION OF THE INVENTION

Figure 2:
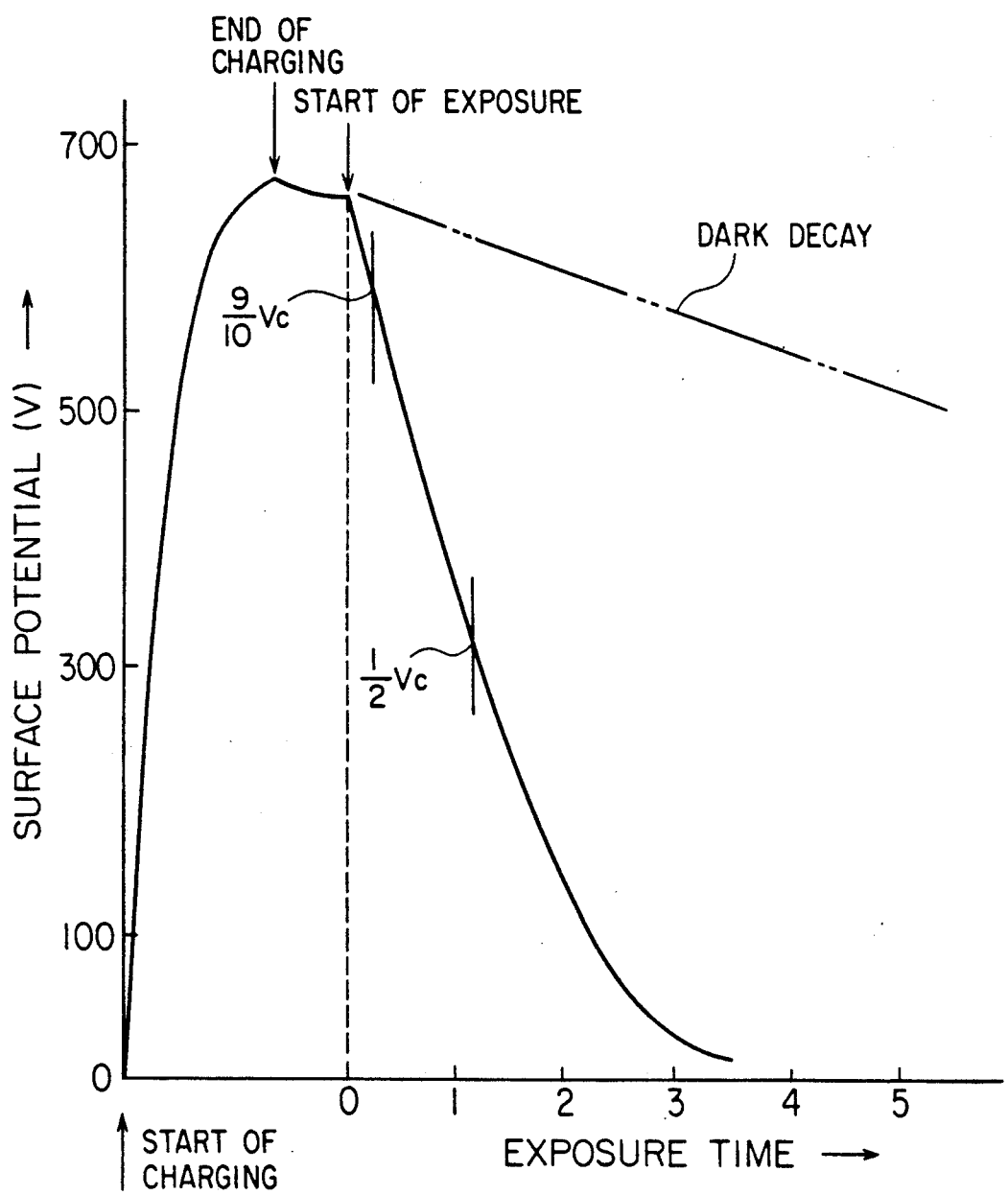
FIG. 2 is a graph which shows the electrostatic characteristics of a Se photoreceptor.

The photoreceptor with a lightsensitive layer containing phthalocyanine particles dispersed in the binder resin, has the preferable semiconductor characteristics for the present invention.

The photosensitive semiconductors used in the present invention are phhalocyanine photoconductive pigments described in Japanese Patent Publication No. 34189/1973, 4338/1974, 17535/1973, Japanese Patent Publication Open to Public Inspection No. 30328/1972, 30329/1972, 38543/1975, and 23738/1976.

To be more exact, they are phthalOcyanine pigments which are represented by a general structural formula $(C_8H_4N_2)_4\,Rn$, in which R represents the following: hydrogen, deuterium, lithium, sodium, potassium, copper, silver, berylium, magnesium, calcium, zinc, cadmium, barium, mercury, aluminum, gallium, indium, lantern, neodymium, samarium, europium, gadolinium, dysprosium, holmium, erbium, thulium, ytterbium, lutetium, titanium, tin, hafnium, lead, thorium, vanadium, antimony, chromium, molybdenum, uranium, manganese, iron, cobalt, nickel, rhodium, palladium, osmium, and platinum. The number n represents 0 to 2. Especially non-metal phthalocyanine and $\alpha, \beta, \gamma, \chi, O$, or $\epsilon$ type copper phthalocyanine are preferable among them. Furthermore, the average particle size of them is preferably 0.1 to 0.01 $\mu$m.

The light decay curve of phthalocyanine is not sensitive to light with low illuminance. When the amount of exposed light is small, the electrostatic potential decays little and the shape of the light decay curve is formed like a plateau. When the amount of exposure exceeds a certain limit, the curve declines sharply.

Therefore, at the peripheral portions of images on an image exposure surface, the illuminance is low because of light diffraction, that is to say, a typical portion is a rising portion of exposure intensity at the peripheral portion of an image in dot exposure or an ending portion of exposure intensity at the peripheral portion of the image, the electrostatic charge rises and declines sharply to form a sharp image, wherein the electrostatic charge is not lost by exposed light with low exposure intensity.

The following are binder resins used in the present invention such as styrene resin, acrylic resin, vinyl chloride-vinyl acetate copolymer, vinyl acetate-methyl methacrylate copolymer, styrene-butadiene copolymer, vinyl toluene-butadiene copolymer, and polycarbonate resin.

The following are thermosetting resins used in the present invention such as phenol resin, urea resin, epoxy resin, unsaturated polyester resin, melamine resin, silicon resin, polyurethane resin, diallyl phthalate resin, and furun resin. The resin which is excellent in electric insulation, coat formation, physical properties, and chemical resistance is chosen among them. In the present invention, it is preferable to use the phenol resin with the construction unit shown by the following general formula. The general formula

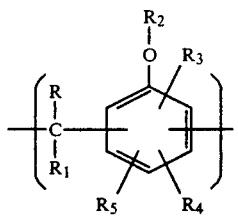

In the formula, R and $R_1$ are hydrogen atoms or methyl groups, $R_2$ is a hydrogen atom or an epoxy group, $R_3$, $R_4$, and $R_5$ are a halogen atom, a hydrogen atom, a hydroxy group, a nitro group, a cyano group, an amino group, a carboxy group, a sulphone acid group or its salt, or a saturated or unsaturated chain type hydrocarbon group with 1 to 3 carbon atoms.

The degree of polymerization of the above-mentioned resin is 2 to 10.000. Preferably it is 2 to 100.

The phenol resin expressed by the above-described general formula is effectively used which is denatured by the resin or its monomer such as melamine, lignin, chroman, indene, hydrocarbon, polyvinyl alcohol, fatty acid amide, acetate, lactone, acetal, chlorophenol, thiophene, or styrenated phenol. Refer to Japanese Patent Publication Open to Public Inspection No. 123035/1979.

The photoreceptor of the present invention is manufactured as follows. First of all, the following materials are prepared. They are the above-described photoconductive fine powder, resin, intensifying dyes such as rose bengal, auramine, brom phenol blue, brom thymol blue, and fuchsine, other intensifiers such as 2,4,7-trinitro-9-fuuorenone, 2,4,5,7-tetranitro-fluorenone, and organic solvents such as benzene, toluene, xylene, trichloro ethylene, ethyl acetate, acetone, and methyl ethyl keton. The slurry for the lightsensitive layer is obtained by mixing and dispersing 100 parts by weight of the photoconductive powder, 1 to 1000 parts by weight of the resin, 0.05 to 10 parts by weight of the intensifying dye. and 50 to 5000 parts by weight of the organic solvent. The lightsensitive slurry obtained in this way is coated on the support. The details of the support are described as follows. The support used in the invention is made of a metal sheet such as copper, iron, nickel, aluminum, and stainless steel, a paper or a plastic film on which a metal such as aluminum, gold, silver, copper, and nickel or a metal oxide such as stannous oxide are vapor-deposited or laminated, and a paper or a plastic film on which resin layer is coated which contains the above-described metalic powder, metal oxide powder, and carbon black powder dispersed in it. The photoreceptor of the invention is made by coating the photosensitive materials to form a layer on the electric conductive support so that the dry layer thickness is 10 to 50 μm. As occasion demands, an intermediate layer made from a polymer or a rectifying semiconductor may be provided.

A latent image forming process by which an excellent dot latent image is obtained, is provided by the above-described photoreceptor on which pulse-modulated dot exposure is conducted after the electrostatic charging process. This photoreceptor can be applied to both contact type developing and non-contact type developing. This photoreceptor is especially applied to the image forming apparatus in which reversal development suitable for non-contact development is composed.

The present invention is of great advantage to the multicolor image forming apparatus in which color toner images are superimposed in turn on the photoreceptor. In considering the advantages of the present invention, account is taken of the absorption spectrum. When exposure is conducted, it is desirable to use light with a wavelength which is hardly absorbed by colored toner. From this point of view, a laser beam with long wave length is more suitable than visible light for the apparatus of the invention.

Laser beams using gas such as He-Ne, He-Cd, or Ar and semiconductor laser beams such as GaAlAs are used for dot exposure. The wavelength is generally more than 700 nm. Accordingly, spectral sensitization processing is generally necessary for the photoreceptor.

Examples of pulse modulation in dot exposure are shown in Table 1.

Figures 1, 10:
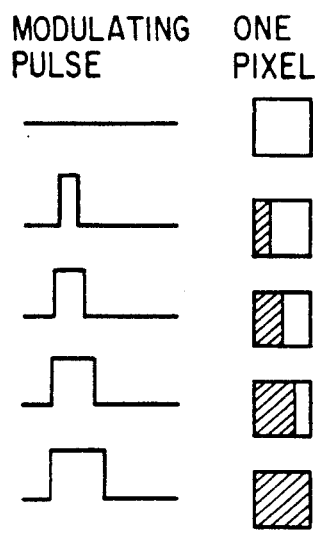
Figures 2, 3, 10:
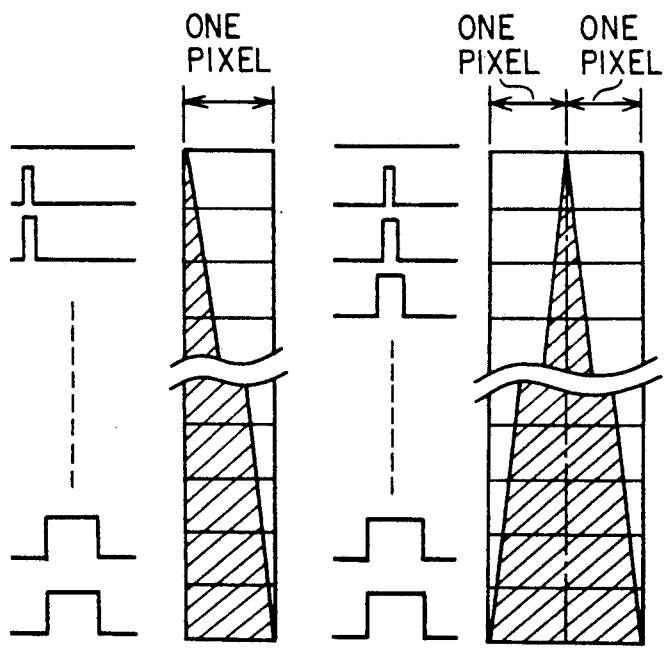

The dot diameter in Table 1 is defined as the diameter of a laser beam whose light intensity is not less than 1/e. As shown in FIG. 10, the dot diameter is shown by the length in the direction of main scanning and subscanning. The modulated pulses and dot patterns in the modulation example 1, 2, and 3 are shown in FIG. 10-1, 10-2, and 10-3.

As shown in FIG. 10-1, the change of level consists of 5 steps in the modulation example 1, and its pulse modulate circuits can be formed comparatively easily. According to the modulation example 1, compared with the binary recording method, images can be reproduced excellently, and especially a slant line can be reproduced clearly.

Figure 3:
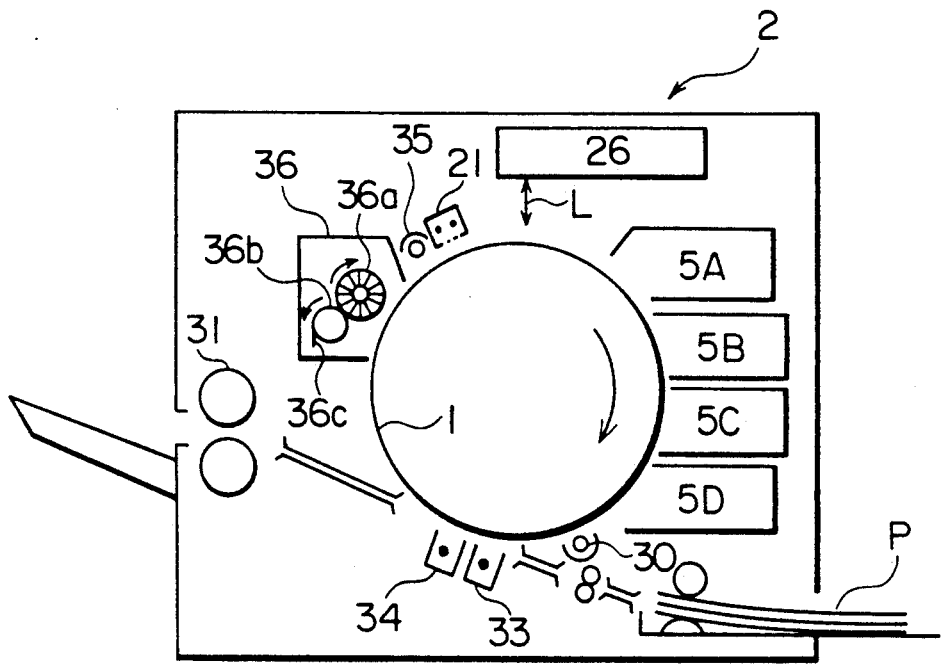
FIG. 3 is a schematic illustration of a multicolor image forming apparatus to which the multicolor image forming method of the present invention is applied.

As Shown in FIG. 10-2 and 10-3, the change of level consists of 256 steps. In the case of modulation example 2, when the multivalue digital video signal for recording is converted to an analog signal by the D/A converter and the signal is converted to a binary value in reference to the reference signal as the triangular pulse which is synchronized with a pixel, which is a recording element, and a pulse for modulation can be obtained. Although the circuits become a little complicated in the case of modulation example 2 as compared with the modulation example 1, a high quality image can be obtained in the modulation example 2.

The modulation example 3 can be actualized by the same circuit as that in the modulation example 2. Since the reference signal is synchronized with the two pixel unit in the direction of main scanning, the resolution corresponding to the main scanning direction substantially becomes half, 8 dots/mm. In the case of the modulation example 3, the half tone of an image can be reproduced remarkably well.

Figure 11:
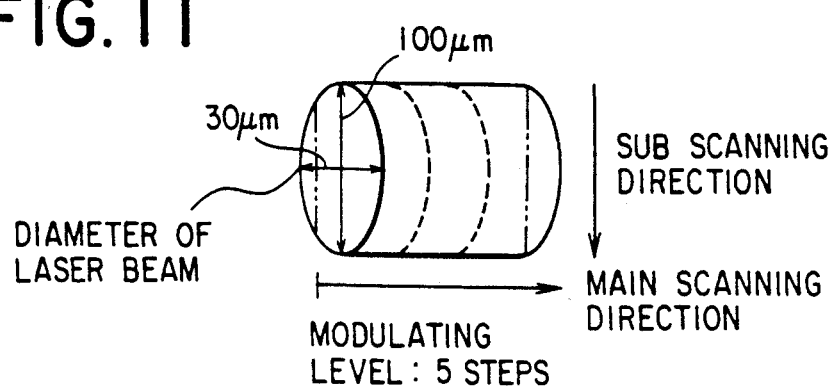
FIG. 11 is an explanatory drawing illustrating dot-shaped light.

FIG. 11 indicates a scanning beam condition on a photoreceptor with a laser beam in the case of the modulation example 1.

TABLE 1

|  | Example 1 | Example 2 | Example 3 |
|---|---|---|---|
| Writing resolution | Main scanning 16 dots/mm | 16 dots/mm | 8 dots/mm |
|  | Sub scanning 16 dots/mm | 16 dots/mm | 16 dots/mm |
| Dot diameter | Main scanning 30 μm | 45 μm | 45 μm |
|  | Subscanning 100 μm | 70 μm | 70 μm |
| Modulation | 5 levels | 256 levels | 256 levels |

TABLE 1-continued

| | Example 1 | Example 2 | Example 3 |
|---|---|---|---|
| level | | | |

Two component developer is suitable for reversal development in the present invention because it is adequate for multipurpose use. Toner mixed with fine silica particles processed with an charge controlling agent, an amine compound and other additives, is used. Concerning the additives, refer to Japanese Patent Application No. 108213/1987 and 119482/1987.

In the transfer type electrostatic copier, it is common to make more than 10 copies in a minute. When a few minutes have passed after the erasing lamp was lit to erase the residual potential on the photoreceptor, the next electric charging starts. For that reason, the irradiated light from the erasing lamp can be used to activate the photoreceptor. By utilizing the erasing lamp, the residual charge can be erased to decay the potential and to prevent the increase of fogging development. At the same time, the light decay can be hastened while the characteristics of the present invention are being kept. For the reason described above, using the light irradiated from the erasing lamp as the activated light is advantageous in terms of the efficiency, structure, and economy of the copier.

EXAMPLES TO ATTAIN THE FIRST OBJECT

In the following examples are described several preferred embodiments to illustrate the invention. However, it is to be understood that the invention is not intended to be limited to the specific embodiments.

| To make a photoreceptor | |
|---|---|
| Example 1 of the photoreceptor | |
| ε type copper phthalocyanine pigment Lionol Blue ER (manufactured by Toyo Ink Co. | 1 part by wt. |
| Desmorhen 800 (polyesterpolyol resin) | 2 part by wt. |
| Hexamethylene diisocyanate | 2 part by wt. |
| Methyl ethyl keton | 6 part by wt. |

The composition mixed by the above-described weight distribution ratio was dispersed by an ultrasonic disperser for 10 minutes at room temperature. Then, it was coated on an electroconductive support, which was made by laminating a 10 μm thick aluminum sheet on a 80 μm thick polyester film, by a rotary coating machine at a rotation speed of 800 rpm so that its dry thickness became 15 μm. The photosensitive layer of the photoreceptor was hardened in a drier at a temperature of 160° to 170° C. for about 2 hours.

Two kinds of electrostatic characteristics of the photoreceptor made in this way were measured with Electrostatic Paper Analyzer SP-428, manufactured by Kawaguchi Denki Co.. according to the measuring processes of Method 1 and Method 2 shown in Table 2. The obtained results are shown in FIG. 1 in which the curves 'a' and 'b' express the electrostatic characteristics of the photoreceptor.

Figure 8:
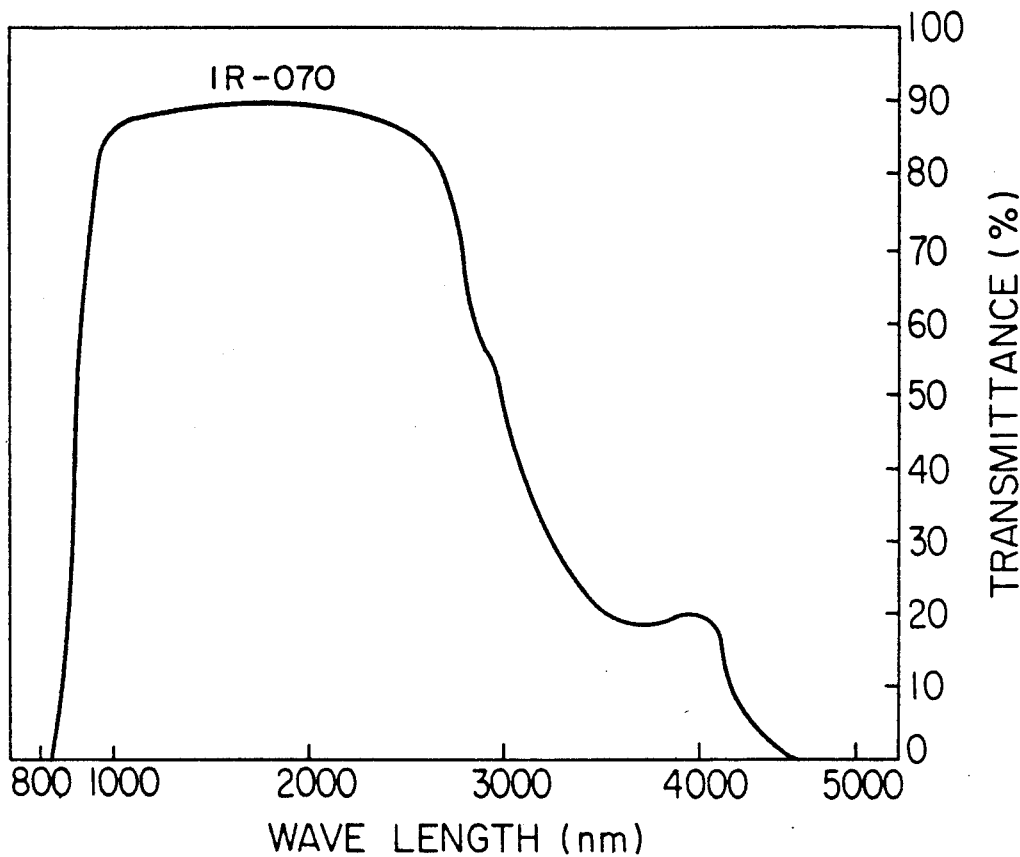
FIG. 8 are the spectral transmittance characteristics in the case of a combination of a halogen lamp and an infrared transmitting filter.

The measuring conditions by Analyzer SP-428 are as follows. Potential of 5 KV was impressed on a Corotron Corona discharger. The distance between the discharging wire and the surface of a sample was kept at 9 mm and the sample was given a positive electric charge. Both image exposure and erasing exposure were conducted by exposing the surface of the sample at a luminance of 3 luxes by tungsten light of 2854° K, through an infrared transmission filter whose characteristics are shown in FIG. 8.

The ratios of sensitivity were as follows.

Method 1 . . . . . (E ½)/(E 9/10)=8.0

Method 2 . . . . . (E ½)/(E 9/10)=2.7

Dark decay correction was not conducted in the above-described sensitivity. Comparing Method 1 with Method 2, the amount of exposure in Method 1 is larger than that in Method 2 and the photosensitivity ratio of Method 1 is higher. For that reason, it is easier to obtain a sharp image in Method 1 than in Method 2. On the other hand, Method 2 is characterized in that the amount of light required to form a latent image is small since spectral sensitization is actually at a high level. Furthermore. Method 2 is suitable for high speed printing.

TABLE 2

| Method | Process | | |
|---|---|---|---|
| 1 | Charging 10 sec (5 KV) | Dark decay 5 sec | Image exposure → |
| 2 | Exposure before charging Charging 10 sec (5 KV) | Dark decay 5 sec | Image exposure → |

As shown in FIG. 1, comparing Curve 'a' in which charging before exposure is not conducted, with Curve 'b' in which exposure before charging is conducted, it can be understood that 'b' is more sensitive. The charged potential of 'a' and that of 'b', are both about 800 V. Not much difference can be seen between the two.

| Example 2 of the photoreceptor | |
|---|---|
| α type copper phthalocyanine pigment Festogen Blue GP (manufactured by Dainippon Ink Chemical Industry Co.) | 0.33 part by wt. |
| Bayron 200 (polyester resin manufactured by Toyoboseki Co.) | 2 part by wt. |
| Methyl ethyl keton | 8 part by wt. |

A compositions having the above-described weight ratio was dispersed by an ultrasonic disperser for 15 minutes at room temperature. Then it was coated on an electroconductive support, which was made by laminating a 15 μm thick sheet of aluminum on a 80 μm thick film of polyester, by a rotary coating machine at a speed of 700 rpm so that the dried layer thickness became 15 μm.

The photosensitive layer was heated in a dryer for about 10 minutes at a temperature of 80° C., to make a photoreceptor. The electrostatic characteristics of the photoreceptor were measured with the above-described measuring instrument SP-428 by the methods of 1 and 2 which were used in the case of Example 1 of a photoreceptor. In this way, each process of charging, dark decay, and light decay was studied. The results were that charging potential was 900 V and dark decay ratio was 20% in both cases.

The ratio of photosensitivity was as follows.

| Method 1 | (E 1/2)/(E 9/10) = 7.0 |
|---|---|
| Method 2 | (E 1/2)/(E 9/10) = 3.0 |

Example 3 of a photoreceptor

| β type copper phthalocyanine pigment Fetogen Blue GNPT (manufactured by Dainippon Ink Chemical Industry Co.) | 0.47 part by wt. |
|---|---|
| Panright (Polycarbonate resin manufactured by Teijinkasei Co.) | 1.4 part by wt. |
| Methylene chloride | 14 part by wt. |

After the composition having the above-described weight ratio was dispersed by an ultrasonic dispenser for 10 minutes at room temperature, ti was coated on a 100 $\mu$m thick stainless steel plate with a rotary coating machine at a speed of 800 rpm so that the dried layer thickness became 20 $\mu$m. This photosensitive layer was dried by a heated air at a temperature of 50° C. for 10 minutes. In this way, the photoreceptor was made.

The electrostatic characteristics of this photoreceptor were measured in the same way as the photoreceptor of Example 2. In the measurement, Method 1 and Method 2 was adopted, and each process of charging, dark decay, ad light decay was investigated. The results were that the charging potential was 1000 V and the dark decay ratio was 22% for both of them.

The ratio of light sensitivity was as follows.

Method 1 . . . . . (E $\frac{1}{2}$)/(E 9/10)=5.0

Method 2 . . . . . (E $\frac{1}{2}$)/(E 9/10)=2.0

EXAMPLE OF A COMPARATIVE PHOTORECEPTOR

Se-Te was coated on an aluminum plate by the method of vacuum deposition. The thickness of the coated layer was 70 $\mu$m. The density of Te was higher by 30% in the upper portion of the layer, and spectral sensitization was conducted to enable the layer to have spectral sensitivity to infrared rays.

The electrostatic characteristics of this photoreceptor were measured in the same way as Example 1 of a photoreceptor.

Charging potential was 900 V and the dark decay ratio was 25% in both Method 1 and Method 2. The photosensitivity ratio of the method 1 was the same as that of the method 2. It can be expressed as follows.

(E $\frac{1}{2}$)/(E 9/10)=0.9

As shown in FIG. 2, spectral sensitivity in the high potential region has excellent characteristics. The effect of the activated exposure can hardly be seen in this case.

EMBODIMENT 1

FIG. 3 shows an embodiment of the multicolor image forming apparatus of the present invention. This apparatus adopts noncontact reversal development in which two component developer is used. The numeral 1 is a photoreceptor of the present invention rotating in the arrowed direction. The numeral 21 is a corona charger. L is an image exposure light with a wave length of 800 nm, which is irradiated from the semiconductor laser optical system 26. The numerals 5A, 5B, 5C, and 5D are developing units with yellow, magenta, cyan, and black toners. The numeral 33 is a transfer electrode. The numeral 34 is a separating electrode. P is a transfer paper. The numeral 30 is an exposure lamp which is used before transfer. The numeral 36 is a cleaning unit. The numeral 36a is a fur brush. The numeral 36b is a toner recovery roller. The numeral 36c is a scraper.

After the photoreceptor 1 is exposed to infrared rays by the exposure lamp 35 before electrostatic charging, its surface is uniformly charged by the corona electrostatic charger 21 consisting of the scorotron electrode. Successively, image exposure light L is exposed to the photoreceptor 1 according to the recorded data sent from the laser optical system 26. A latent image is formed in this way. This latent image is developed by the developing unit 5A in which the first toner, yellow toner $T_1$, is contained.

The photoreceptor on which toner image are formed, is uniformly exposed again by the the pre charge exposure lamp 35. After that, the photoreceptor is exposed to image forming light L according to the other recorded color data. The formed latent image is developed by the developing unit 5B in which the second toner, the magenta toner $T_2$, is contained.

As a result, two color toner images consisting of the first toner $T_1$ and the second toner $T_2$, are formed on the photoreceptor. In the same way, the cyan toner $T_3$ and the black toner $T_4$ are developed and superimposed on the photoreceptor 1. Finally, four color images are formed on the photoreceptor 1.

The multicolor images formed on the photoreceptor are uniformly exposed by the pre-transfer exposure lamp 30 as occasion demands. Then the images are transferred to transfer paper P by the transfer electrode 33. Transfer paper P is separated from the photoreceptor 1 by the separating electrode 34 and transferred to the fixing unit 31. The photoreceptor 1 is cleaned by the cleaning unit 36. The fur brush 36a in the cleaning unit 36 is kept out of contact with the photoreceptor 1 while images are being formed. After multicolor images are formed on the photoreceptor and transferred to a transfer paper, the fur brush comes into contact with the photoreceptor 1 and rotates in the arrowed direction to remove the residual toner from the photoreceptor.

A resilient rubber blade may be used in order to remove the residual toner instead of the fur brush. A photosensitive layer composed of a thermosetting binder is not only excellent in cleaning efficiency but also provides an improved cleaning method because it is hard and not damaged by the fur brush. It is advantageous in that the cleaning force can be set higher in this photosensitive layer than the conventional photosensitive layer to improve cleaning.

After cleaning, the fur brush 36b is separated from the photoreceptor 1 again. While the toner recovery roller 36b is rotated in the arrowed direction, appropriate bias is impressed on the toner recovery roller to recover toner T from the fur brush 36b. Furthermore, the recovered toner is scraped off from the toner recovery roller 36b by the scraper 36c.

Figure 4:
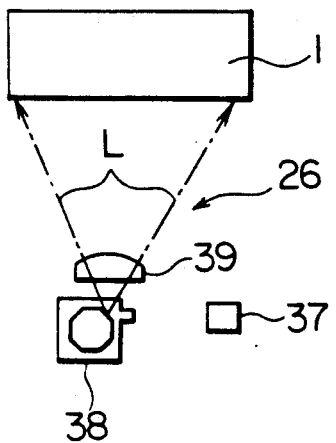
FIG. 4 is a schematic illustration of an optical laser system.

The laser optical system 26 of the embodiment is shown in FIG. 4. In FIG. 4, the numeral 37 is a semiconductor laser diode. The numeral 38 is a rotary polygon mirror. The numeral 39 is a fθ lens.

Figure 5:
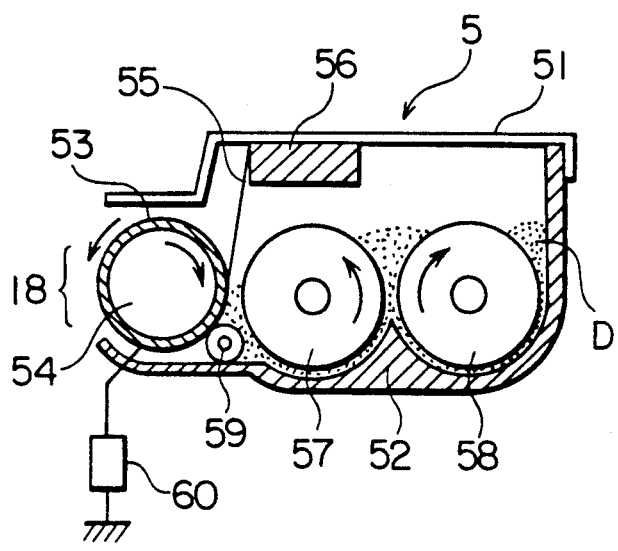
FIG. 5 is a sectional view of a developing unit.

FIG. 5 is a sectional view of the developing unit 5. In FIG. 5, the numeral 51 is a housing, the numeral 53 is a sleeve, and the numeral 54 is a magnetic roll, which is installed in the sleeve 53, with N and S poles to generate the magnetic field. The numeral 55 is a toner layer forming member. The numeral 56 is a fixing member to fix the toner layer forming member 55. The numeral 57 is a first stirring member. The numeral 58 is a second stirring member. The numeral 59 is a sleeve cleaning member. The numeral 60 is a power supply for the developing bias. The numeral 18 is a region where the toner, which was conveyed by the sleeve 55, can fly from the sleeve 53 to the photoreceptor 1 by electrostatic force. T represents toner and D represents developer. In this developing unit, the stirring members 57 and 58 are screw-shaped members, and they mix and convey developer by rotating in the arrowed direction shown in FIG. 5. The stirring member 57 is shaped so as to convey developer towards the viewer of FIG. 5, while the stirring member 58 is shaped so as to convey developer away from the viewer. The wall 52 is installed between the stirring members 57 and 58 to prevent developer remaining in the middle portion between them. Because of the structure described above, the toner moves from the stirring member 57 to 58 and from the stirring member 58 to 5 when the stirring members 57 and 58 are rotated.

The toner is supplied to the developing unit 5 from the viewer side of FIG. 5. The toner is conveyed away from the viewer of FIG. 5 by the stirring member 58, while the toner is conveyed towards the viewer of FIG. 5 by the stirring member 57. In this way, the toner is circulated by the stirring members 57 and 58 to mix the toner and carrier uniformly. However, the position from which the toner is supplied, is not intended to be limited to this embodiment. For instance, the toner may be uniformly supplied to the sleeve from the right side with regard to FIG. 5.

Developer D is completely kneaded and mixed in this way and conveyed in the same direction as the sleeve 53 rotating direction by the sleeve 53 which rotates in the arrowed direction and the magnetic roller 54. The layer forming member 55 comes into contact with the circumferential surface of the sleeve 53 with pressure. The layer forming member 55 is fixed by the fixing member 56. The amount of developer D conveyed by the sleeve 53 is restricted by the layer forming member 55 to form the proper developer layer on the surface of the sleeve 53.

When development is conducted in the embodiment of the invention, there are several other methods to form the developer layer on the sleeve 53. For instance, publicly known devices to form the developer layer may be used such as the magnetic or nonmagnetic restricting plate which is so situated as to leave a prescribed space between the end of the plate and the sleeve, and the magnetic roll which is situated close to the sleeve.

Developer consisting of toner and small Carrier particles is better in terms of image resolving power and gradation reproducibility. For example, when the carrier in the developer is small, not more than 40 μm, foreign matter in the developer and lumps of developer can be automatically eliminated by using the above-described layer forming member 55. As a result, magnetic bristles with uniform length can be formed on the sleeve 53. Furthermore, when the above-described carrier particles are made as small as the toner particles, foreign matter can be eliminated and magnetic bristles with uniform length can be formed.

Referring to FIG. 5, the sleeve cleaning roller 59 rotates in the arrowed direction and removes the developer, in which toner has been consumed in passing the developing region 18. For that reason, the amount of toner T which is conveyed to the developing region 18 can be kept constant. Accordingly, developing conditions become stabilized.

The composition of the developer used in the embodiment will be described as follows.

| (Composition of developer) | |
|---|---|
| Toner | |
| Polystyrene | 45 weight parts |
| Polymethyl methacrylate | 44 weight parts |
| Charging control agent | 0.2 to 1.0 weight parts |
| Colorant | 3 to 15 weight parts |

The above-described composition are mixed, kneaded, pulverized and classified to obtain a toner the average particle diameter size of which is 3 μm.

Incidentally, in the present invention, the average particle size is obtained on the basis of weight.

| Carrier (Resin coated carrier) | |
|---|---|
| Core | Ferrite |
| Coating resin | Styrene Acryl copolymer (4:6) |
| Magnetization | 27 emu/g |
| Particle size | 30 μm |
| Specific gravity | 5.2 No Dimension |
| Specific resistance | Not less than $10^{13} \Omega \cdot cm$ |

The developer was made by mixing the above-described compositions.

Figure 6:
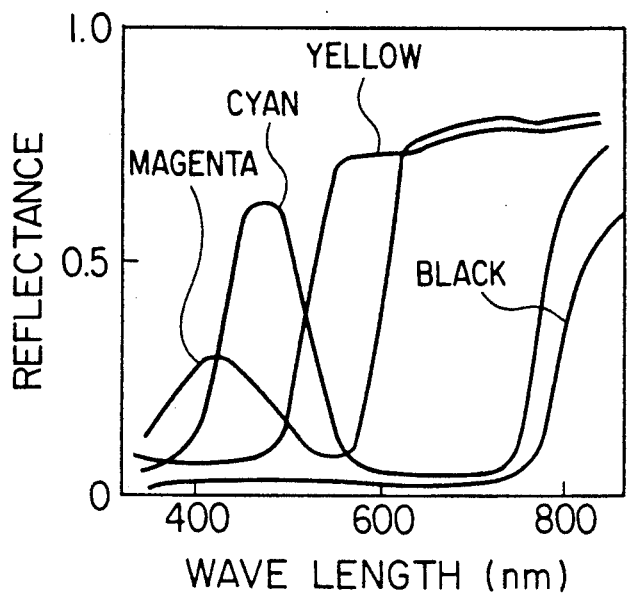
FIG. 6 and FIG. 9 are graphs which show spectral reflectance of toner.

FIG. 6 shows the spectral characteristics of the toner. These spectral characteristics were measured as follows. A pressure sensitive double coated adhesive tape with high transmittance was stuck on one side of a white paper to make an adhesive surface. The toner was uniformly stuck on this adhesive surface and the spectral reflectance was measured. After the measurement results were compensated by the spectral reflectance measured when there was no toner on the surface, the spectral reflectance was obtained. A photometer (HITACHI Type 330) manufactured by Hitachi Seisakusho Co. was used to measure the spectral reflectance. The wave length range was 360 to 850 nm in the measurement. The light used for exposing the photoreceptor before electrostatic charging or the light used for image exposing is preferably infrared. The reason is that a decrease in transmitted light according to absorption of light by the toner on the photoreceptor must be prevented.

The following colorants may be used in the toner in order to enable the toner to have such spectral characteristics.

They are Benzidine Yellow G (C.I.21090), Benzidine Yellow GR (C.I.21100), Permanent Yellow DHG (manufactured by Hechist Co.). Brilliant Carmine 6B (C.I.15850), Rhodamine 6G Lake (C.I.45160), Rhodamine B Lake (C.I45170), Phthalocyanine Blue non Crystal (C.I.74160). Phthalocyanine Green (C.I.74260), Carbon Black, Fat Yellow 5G. Fat Yellow 3G, Fat Red 5G, Fat Red HRR, Fat Red 5B, Fat Black HB, Zapon Fast Black RE, Zapon Fast Black B, Zapon Fast Blue HFL, Zapon Fast Red BB, Zapon Fast Red GE, Zapon Fast Yellow G, and Quinacridone Red (C.I.465000).

Various kinds of light source which irradiate infrared rays or a white light source covered by an infrared transmission filter may be used as the precharging lamp 35 used before electrostatic charging.

The following were used in this embodiment.

Figure 7:
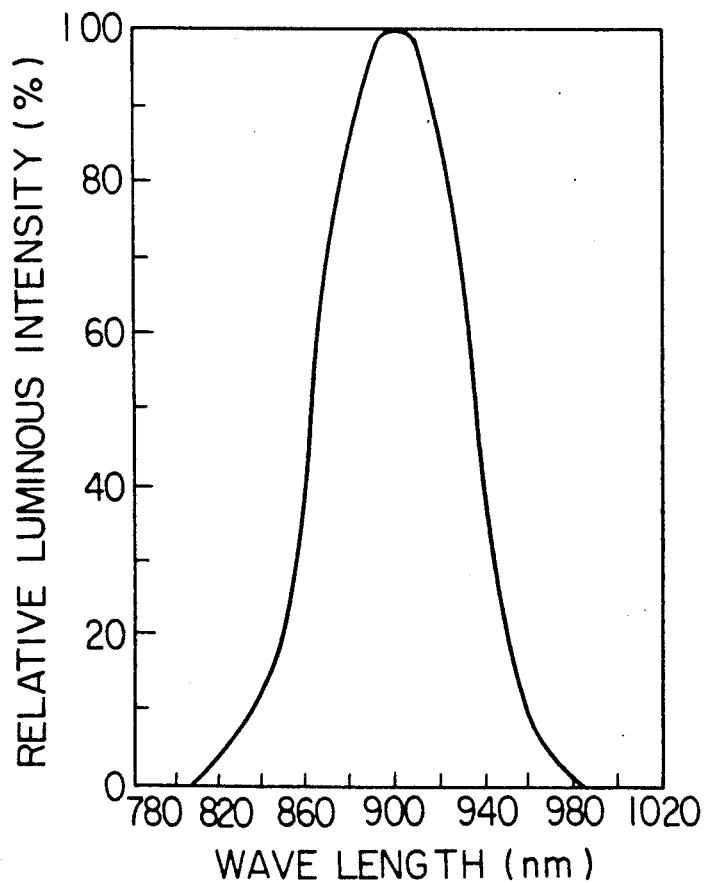
FIG. 7 are the emission spectrum characteristics of a GaAlAs infrared light emitting diode.

(1) GaAlAs infrared ray emitting diode (manufactured by Matsushita Denki Co. Type LN 172) The spectral distribution in FIG. 7 shows its emission spectrum characteristics.

(2) The combination of a halogen lamp and an infrared transmission filter (manufactured by Toshiba Glass Co. Type IR-D70) Its spectral transmission characteristics are shown in FIG. 8. The above-described (1) and (2) were used as the pre transfer lamp.

Table 3 displays the image forming conditions in the multicolor image forming apparatus shown in FIG. 3.

TABLE 3

| Photoreceptor | Organic photoreceptor (Example 1 of photoreceptor) (180 φmm drum) |
|---|---|
| Linear velocity | 150 mm/s |
| Surface potential | |
| Nonexposed portion | +800 V |
| Exposed portion | +50 V |
| Sleeve (common) | |
| Diameter | 20 mm |
| Materials | Non-magnetic stainless steel (Sand Blast was conducted on the surface. The surface roughness is 3 μm.) |
| Linear Velocity | 500 mm/s (c.c.w.) |
| Magnetic roller (common) | |
| Number of poles | 12 |
| Rotating speed | 1500 rpm (c.w.) |
| Flux density at the sleeve surface (common) | 600 G (maximum) |
| Developing gap (common) | 500 μm |
| Bias DC voltage | |
| Yellow | +700 V |
| Magenta | +700 V |
| Cyan | +700 V |
| Black | +700 V |
| AC (common) | 3 KVp-p, 5 KHz |
| Amount of toner deposited on the sleeve (common) | 0.6 mg/cm$^2$ |
| Resolution in writing | 32 dots/mm Writing level: 2 digits |

The intensity distribution of a spot of a laser beam is approximately Gaussian distribution. The diameter of a circle where the amount of light is 1/e of the amount of exposure light, is about 45 μm.

Multicolor image forming was conducted under the above-described image forming conditions. The results were so good that a dot was reproduced excellently and a stable multicolor image could be formed.

Especially in the region where toner images were superimposed, stable toner images were formed. According to the evaluation of obtained images, it is preferable that the exposure intensity is 1.5 to 4 times as much as the half decay exposure. It can be understood that a potential pattern with sharp potential variation is formed under these image forming conditions.

The surface potential was measured both when exposure before electrostatic charging was conducted and when it was not conducted, in the same way as in Method (1) and (2) in Example 1 of a photoreceptor, wherein exposure intensity is used as the parameter.

The resulting potential characteristics were similar to those in FIG. 1, in the data of Example 1 of a photoreceptor.

EMBODIMENT 2

In this embodiment, the image forming conditions were set as follows. Writing resolution was set to be 16 dot/mm and pulse-duration modulation was set to be 5 steps. The exposure light intensity distribution of a dot formed by a laser beam corresponding to 1 pulse is approximately Gaussian distribution. The size of a dot formed by a laser beam is 30 μm in the main scanning direction and 100 μm in the subscanning direction. The other conditions were the same as those of Example 1.

Image forming was conducted under the above-described conditions. The results were that excellent images could be stably formed in which a laser beam dot was clearly reproduced corresponding to the pulse-duration modulation.

Especially, next toner images were stably formed on previous toner images in the toner image superimposing region.

According to the evaluation of images, it is preferable that the exposure intensity is 1.5 to 4 as much as the half decay exposure. It can be understood that a small size dot formed by a laser beam with a sharp potential variation can be formed under the image forming conditions mentioned above.

EMBODIMENT 3

The experiment was made under the same conditions as Embodiment 1 except that the photoreceptor examples (1), (2), and (3) and the methods (1) and (2) were used. The evaluation of obtained color samples are described as follows. The larger the sensitivity ratio (E ½)/(E 9/10) was, the better the obtained images were. It was especially preferable that the sensitivity ratio was not less than 3. Better images were obtained when the method (1) was applied to the experiment.

COMPARATIVE EXAMPLE 1

The comparative photoreceptor 1 was used to form color images under the same conditions as Embodiment 1. Compared with Embodiment 1, a laser beam dot was not completely reproduced. Furthermore, a next toner image was not stably formed on a previous toner image. It can be understood that the light shielding effect of the previous toner image fluctuated according to the amount of deposited toner and a stable potential pattern was not formed.

When the exposure intensity was weak, toner images were not completely formed. When it was strong, the dot size became too large and a decrease in resolution was observed.

COMPARATIVE EXAMPLE 2

Color image forming was conducted with the comparative photoreceptor (1) under the same conditions as Embodiment 2. Compared with Embodiment 1, the dot shape corresponding to the pulse-duration modulation was not completely reproduced. Furthermore, successive toner images were not stably formed on previously formed images.

It can be understood that the shielding effect of the previous toner image fluctuated and a stable potential pattern was not formed.

When the exposure intensity was weak, toner images were not completely formed. When the exposure intensity was strong, the dot size became large and it caused a deterioration in resolution.

According to the present invention described above, clean multicolor images without noise and contamination can be stably formed.

The above-described second object of the present invention can be attained by an image forming apparatus the details of which will be described below. The image forming apparatus is equipped with a photoreceptor which has a photosensitive layer containing a thermosetting resin in which photoconductive semiconductor powder is dispersed. The image forming apparatus has the processes such as an electrostatic charging process for the photoreceptor, an electrostatic latent image forming process by image exposure, and a non-contact developing process for images formed with spherical toner.

In the present invention, the spherical toner is of a toner which is spherically shaped so as to have a ratio between a length of apsides and a length of the minor axis not larger than 3.0.

It is preferable to use a regular spherical toner as the spherical toner for the invention.

The structure to attain the second object of the present invention can be actualized by the photoreceptor, the electrostatic charging unit, the image exposure unit, and the developing unit which were described in the explanation of the structure to accomplish the first object of the present invention. Only the structure which is preferably used to accomplish the second object of the present invention will be described hereafter. As mentioned above, the structure can also be applied to an image forming apparatus to accomplish the first object of the invention.

In the embodiment of the present invention, non-contact development and reversal development are preferably used. It is preferable to use spherical toner the average size of which is 1 to 7 μm. When phthalocyanine is dispersed in the photosensitive layer, a sharp image can be obtained.

Technology to manufacture spherical toner which can increase fluidity of toner and electrostatic charging efficiency in the present invention, is disclosed in 'The thermal spheroidization processing method to make spheric toner' (Japanese Patent Publication Open to Public Inspection NO. 52758/1981, No. 127662/1984), 'The method to make resin particles spherical by spreading them in an air current and melting their surface' (Japanese Patent Publication Open to Public Inspection No. 134650/1983), 'The method by pulverizing and making toner spheric at the same time at a high temperature' (Japanese Patent Publication Open to Public Inspection No. 61627/1986), and 'The method to make toner spheric by melting the surface of the toner' (Japanese Patent Publication Open to Public Inspection No. 121048/1981). 'The method to make spherical toner in a solution such as the granulating polymerization method' may also be used.

When the average size of spherical toner is made within 1 to 7 || m, color image formation becomes stable and color reproduction becomes very well, without causing cleaning problem and adverse effect in toner layer potential and image exposure due to superimposition of toner image.

The following are resins used for making the spherical toner in the present invention They are a styrene-acrylic copolymer resin obtained by copolymerization with a styrene, an acrylic ester monomer such as butyl acrylate and a methacrylic ester monomer such as methyl methacrylate, polyester resin, polyamide resin, polyurethane resin, and polyurea resin.

Magnetic materials used for the developer carrier and the magnetic toner of the present invention are; metals with ferromagnetism such as ferrite, magnetite, cobalt, and nickel; alloys with ferromagnetism; and compounds which contain these elements.

The colorants mixed into the binder resin of the toner are described before. The colorants are contained in the binder resin by 1 to 20 wt per 100 wt of the resin.

Furthermore, the charging control agent may be used which controls frictional charging of the toner.

As for the charging control agent, nigrosine type dyes, metal complex dyes, ammonium salt compounds, and aminotriphenyl methane type dyes may be used.

The charging control agent is contained in the binder resin by 0 to 5 wt per 100 wt of the resin.

Polyolefine may be added to the binder resin to improve the offset property

Furthermore, inorganic fine particles may be mixed with the toner of the invention in order to improve liquidity. The following inorganic materials are used for this object silica powder, alumina, titanium oxide, barium titanate, magnesium titanate, calcium titanate, strontium titanate, zinc oxide, quartz sand, mica, wollanstonite, diatomaceous, chromium oxide, cerium oxide, iron oxide red, antimony trioxide, magnesium oxide, zirconium oxide, barium sulfate, barium carbonate, calcium carbonate, silicon carbonate, and silicon nitride. Silica fine powder is particularly preferable among them. In order to increase the cleaning efficiency in the cleaning system in which blades are used, metal salt of fatty acid such as zinc stearate may be added to the developer by 0.01 to 5 wt.

The second object can be accomplished by the multi-color image forming apparatus shown in FIG. 1 in the same way as the first object. Development is conducted in this apparatus by non-contact and reversal developing system in which two component developer is used.

The composition of the developer used in this embodiment is follows.

| Toner | |
| --- | --- |
| Polystyrene | 45 weight parts |
| Polymethyl methacrylate | 44 weight parts |
| Barifast (charge controlling agent) | 0.2 weight parts |
| Colorant | 10.5 weight parts |

After the above-described composition is mixed, kneaded, pulverized and classified, spherical toner can be obtained by processing with a hot wind.

| Carrier (carrier coated with resin) | |
| --- | --- |
| Core | Spherical ferrite |
| Coated resin | Styrene-acrylic copolymer resin (4:6) |
| Magnetization | 27 emu/g |
| particle size | 30 μm |
| Specific gravity | 5.2 |
| Specific resistance | not less than $10^{13}$ Ω · cm |

The carrier was made as follows. The above-described core was coated with the resin by a spraying method. After that, it was dried.

Figure 9:
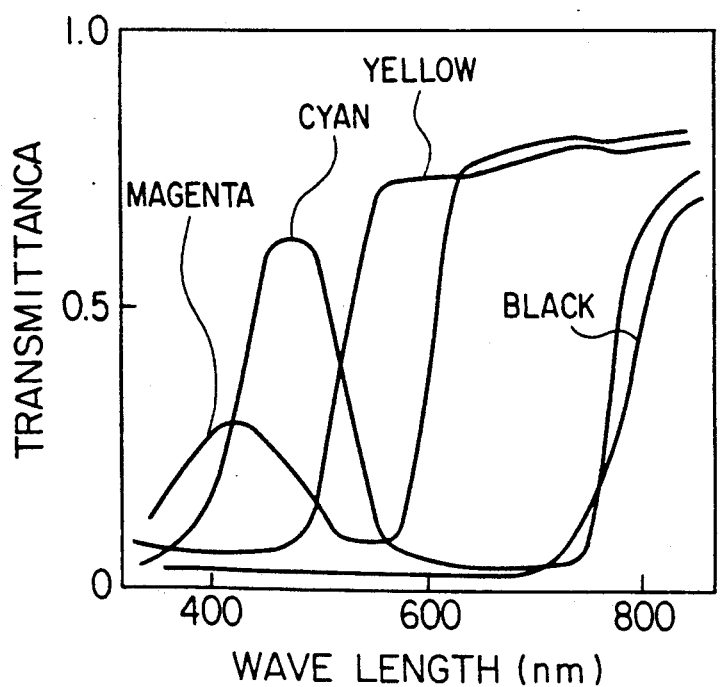

FIG. 9 shows the spectral characteristics of the toner. The spectral characteristics were measured as follows. A pressure sensitive both side coated adhesive tape with high transmittance was stuck on one side of a transparent sheet which is commonly used for an overhead projector to make an adhesive surface. The toner was uniformly coated on this adhesive surface to measure the spectral transmittance. The measurement results were corrected by the spectral transmittance of a sheet with no toner. In this way the spectral transmittance of the toner was obtained.

A spectrophotometer manufactured by Hitachi Seisakusho Co. (Hitachi Type 330) was used in the measurement. The wave length range was 360 to 850 nm.

In order to enable the toner to have such spectral characteristics, the above-described colorant can be used.

Table 4 shows the conditions to form color images in this embodiment by the multicolor image forming apparatus shown in FIG. 3.

TABLE 4

| Laser beam main scanning speed | 800 m/s |
|---|---|
| Laser beam subscanning speed | 150 mm/s |
| Scanning time for a pixel | 78 ns |
| Photoreceptor | Organic photoreceptor (phthalocyanine photoreceptor with phenol resin binder) (180 φmm drum) |
| Linear velocity | 150 mm/s (c.w.) |
| Surface potential | |
| Non-exposed portion | +700 V |
| Exposed portion | +50 V |
| Sleeve (common) | |
| Diameter | 20 mm |
| Material | Non-magnetic stainless steel (The surface was processed by sand blasting. 3 μm) |
| Linear velocity | 500 mm/s (c.c.w.) |
| Magnetic roller (common) | |
| Number of poles | 12 |
| Revolution speed | 1500 rpm (c.w.) |
| Magnetic flux density on the sleeve surface (common) | 600 G (maximum) |
| developing gap (common) | 500 μm |
| Bias DC | |
| Yellow | +600 V |
| Magenta | +600 V |
| Cyan | +600 V |
| Black | +650 V |
| AC (common) | 3 KVp-p, 5 KHz |
| Amount of toner deposited on the sleeve (common) | 0.6 mg/cm$^2$ |

Remarks: Writing resolution: 16 dot/mm
Writing level: 2 digits

The particle size of the spherical toner fluctuates less than the toner the particles of which have an irregular shape. As a result, the toner with almost a uniform particle size can be obtained. Accordingly, the amount of electrostatic charge of the toner particles can be equalized and the developing characteristics can be improved to obtain a sharp development image.

When the spherical toner with the above-described characteristics is used in development being combined with the photoreceptor which is composed of the conductive support covered with the photosensitive layer comprising thermosetting resin in which the above-described photoconductive semiconductor powder is dispersed, a sharp image with high quality can be obtained.

Dot exposure combined with the above-described electrostatic latent image forming process is further effective to increase subjective sharpness.

According to the present invention, a multicolor image forming apparatus with high transfer efficiency and good cleaning ability, can be obtained and high quality clean multicolor images without color contamination can be stably formed.

What is claimed is:

1. An apparatus for forming a toner image by reversal development, comprising:

a charging means for uniformly charging a photoreceptor to a given electrostatic potential;

said photoreceptor discharging in response to an exposure light to form an electrostatic latent image, said photoreceptor having a predetermined light decay curve indicating a relation between an amount of the exposure light and a discharged potential on the exposed portion wherein an absolute value of the differential coefficient of the light decay curve is small when the amount of the exposure light is small and said value sharply becomes large when the amount of the exposure light increases;

an exposure means for exposing said photoreceptor with a dot-shaped light; and a developing means for providing toner onto said exposed portion of said latent image, thereby forming a toner image, wherein said light decay curve satisfies the relationship $$1 < E\frac{1}{2}/E\,9/10$$

E 9/10 being a light sensitivity of said photoreceptor when said electrostatic potential has decayed to 9/10 of that at the start of said exposure and E ½ is a light sensitivity of said photoreceptor when said electrostatic potential has decayed to ½ of that at the start of said exposure.

2. The apparatus of claim 1,
wherein said light decay curve satisfies the following relation;

$$2 \leq (E\tfrac{1}{2})/(E\,9/10).$$

3. The apparatus of claim 1,
wherein said photoreceptor includes a photoconductive layer containing semiconductive particles, and wherein said semiconductive particles contain phthalocyanine.

4. The apparatus of claim 1,
wherein said photoreceptor includes a photoconductive layer containing thermosetting resin in which photoconductive semiconductive particles are dispersed.

5. The apparatus of claim 4,
wherein said developing means provides spherical toner particles onto said exposed portion of said photoreceptor.

6. The apparatus of claim 1,
wherein said developing means is a non-contact type developing device.

7. The apparatus of claim 1,
wherein said exposure means generates said dot-shaped light by means of pulse width modulation.

8. The apparatus of claim 1,
wherein said charging means, said exposure means and said developing means are actuated in turn repeatedly, thereby superimposing plural toner images on said photoreceptor.

9. An apparatus for forming a toner image by reversal development, comprising:
a charging means for uniformly charging a photoreceptor to a given electric potential;
said photoreceptor discharging in response to an exposure light to form an electrostatic latent image, said photoreceptor having a predetermined light decay curve representing a relation between an amount of the exposure light and a discharged potential on the exposed portion wherein an absolute value of the differential coefficient of the light decay curve is small when the amount of the exposure light is small and said value sharply becomes large when the amount of the exposure light increases;
an exposure means for generating a dot-shaped light by means of pulse width modulation and for exposing said photoreceptor with said dot-shaped light; and
a developing means for providing toner onto said exposed portion of said latent image, thereby forming a toner image,
wherein said light decay curve satisfies the relationship $$1 < E\ \tfrac{1}{2}/E\ 9/10$$

E 9/10 being a light sensitivity of said photoreceptor when said electrostatic potential has decayed to 9/10 of that at the start of said exposure and E ½ is a light sensitivity of said photoreceptor when said electrostatic potential has decayed to ½ of that at the start of said exposure.

10. The apparatus of claim 9
wherein said light decay curve satisfies the following relation;

$$2 \leq (E\ \tfrac{1}{2})/E\ 9/10)$$

11. The apparatus of claim 9
wherein said photoreceptor includes a photoconductive layer containing semiconductive particles, and
wherein said semiconductive particles contain phthalocyanine.

12. The apparatus of claim 9
wherein said photoreceptor includes a photoconductive layer containing thermosetting resin in which photoconductive semiconductive particles are dispersed.

13. The apparatus of claim 9
wherein said developing means provides spherical toner particles onto said exposed portion of said photoreceptor.

14. The apparatus of claim 9
wherein said developing means is a non-contact type developing device.

15. An apparatus for forming a toner image by reversal development, comprising:
a charging means for uniformly charging a photoreceptor to a given electric potential;
said photoreceptor discharging in response to an exposure light to form an electrostatic latent image, said photoreceptor having a predetermined light decay curve representing a relation between an amount of the exposure light and a discharged potential on the exposed portion wherein an absolute value of the differential coefficient of the light decay curve is small when the amount of the exposure light is small and said value sharply becomes large when the amount of the exposure light increases;
an exposure means for exposing said photoreceptor with a dot-shaped light; and
a developing means for providing toner onto said exposed portion of said latent image, thereby forming a toner image,
wherein said charging means, said exposure means and said developing means are actuated in turn repeatedly, thereby superimposing plural toner images on said photoreceptor,
wherein said light decay curve satisfies the relationship $$1 < E\ \tfrac{1}{2}/E\ 9/10$$

E 9/10 being a light sensitivity of said photoreceptor when said electrostatic potential has decayed to 9/10 of that at the start of said exposure and E ½ is a light sensitivity of said photoreceptor when said electrostatic potential has decayed to ½ of that at the start of said exposure.

16. The apparatus of claim 14
wherein said light decay curve satisfies the following relation;

$$2 \leq (E\ \tfrac{1}{2})/E\ 9/10)$$

17. The apparatus of claim 15
wherein said photoreceptor includes a photoconductive layer containing semiconductive particles, and
wherein said semiconductive particles contain phthalocyanine.

18. The apparatus of claim 15
wherein said photoreceptor includes a photoconductive layer containing thermosetting resin in which photoconductive semiconductive particles are dispersed.

19. The apparatus of claim 15
wherein said developing means provides spherical toner particles onto said exposed portion of said photoreceptor.

20. The apparatus of claim 15
wherein said developing means is a non-contact type developing device.

* * * * *